April 7, 1942.  P. ANDERSON  2,278,969
WELDING HEAD PROTECTIVE DEVICE
Filed Jan. 28, 1941
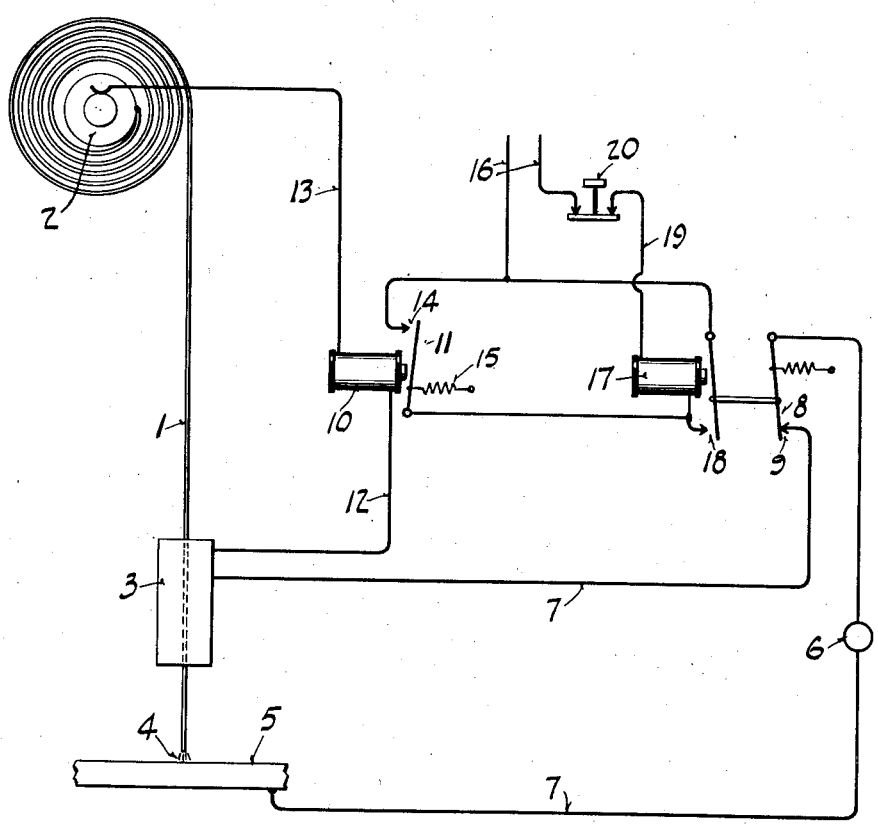
Perry Anderson
INVENTOR.
BY *[signature]*
ATTORNEY.

Patented Apr. 7, 1942

2,278,969

UNITED STATES PATENT OFFICE 2,278,969

WELDING HEAD PROTECTIVE DEVICE

Perry Anderson, Wauwatosa, Wis., assignor to A. O. Smith Corporation, Milwaukee, Wis., a corporation of New York Application January 28, 1941, Serial No. 376,313

7 Claims. (Cl. 219—8)

This invention relates to a device for protecting a welding head or weldrod feeding mechanism from injury by the development of excessive heat where electrical contact is made with the weldrod.

In electric arc welding with long lengths of bare or covered weldrods which may be supplied from a reel, a welding head or weldrod feeding mechanism is employed to gradually unreel the weldrod and feed it to the work piece in accordance with its consumption in the welding process. As it is impracticable to pass the welding current through a long length of weldrod because of the excessive electrical losses and heating which this would entail, the welding head is provided with contacts for conducting the welding current to the metal core of the weldrod near the welding arc.

Various types of welding heads have been devised for this purpose of which one is shown and described in my co-pending application for patent, Serial No. 324,571, filed March 18, 1940. In this, as in all the other types devised for use with heavily covered weldrods, it occasionally happens that the contacts become dirty due to the pressure of the covering or to other causes, and fail to make good electrical contact with the metal core of the weldrod. When this occurs, the increased resistance at the contact results in the development of heat which may burn out the contacts and otherwise injure the feeding mechanism.

An object of the present invention is to provide means to prevent damage to the contacts and welding head when poor contact is made with the metallic core of the weldrod.

Another object is to provide means to detect any lack of proper contact and to stop the welding operation or signal the operator upon this event.

Another object is to provide means to prevent resumption of welding operations until the apparatus is reset manually by the operator.

These and other objects of the invention will be clear from the following detailed description and the accompanying drawing in which the sole figure shows diagrammatically the disposition of the equipment and electric circuits employed in the invention.

The weldrod 1 may be supplied from a reel 2 on which it is wound. The weldrod feeding mechanism, indicated schematically at 3, may be of any suitable kind, and is controlled manually or automatically to feed the weldrod 1 to a welding arc 4 between the end of the weldrod and work piece 5.

Welding current is supplied by a generator 6 connected to leads 7 of which one runs to the work piece 5 and the other to welding head 3 where contact is made with weldrod 1. One of the leads from the generator runs through an independently tripped circuit breaker 8 having contacts 9.

The solenoid 10 of a relay switch 11 is connected by leads 12 and 13, respectively, to the weldrod feeding mechanism 3 and reel 2 on which the weldrod is wound. The end of the weldrod is electrically connected to the reel so that the solenoid 10 is shunted across the contact between the weldrod feeding mechanism and weldrod 1, and consequently has impressed upon it the voltage drop caused by the flow of welding current across the contact. When the contact is good, its resistance and the voltage drop across it are small, and contact points 14 of relay 11 are kept separated by a spring 15. The solenoid 10 is of relatively high resistance as compared with the balance of its circuit across the contact, and is sensitive to any substantial change in voltage drop across the contact irrespective of a general variance in the resistance of the outside circuit.

When the resistance of the contact between the welding head and the metal core of the weldrod is increased due to the presence of dirt or any other cause, the voltage drop across the contact caused by the passage of the welding current is also increased. This sends more current through solenoid 10 of relay 11 and causes the contacts 14 to be closed against the resistance of spring 15. Closing of contacts 14 allows current from a battery or generator or other source of current connected to terminals 16 to flow through solenoid 17 of the independently tripped circuit breaker 8. This separates contacts 9 and opens the circuit through which current is supplied to the welding arc 4 from welding generator 6, thereby avoiding all possibility of damage to the welding head 3 because of excessive heating developed by the passage of welding current across the contact between the welding head and the core of the weldrod.

When solenoid 17 operates circuit breaker 8 to open the welding circuit it closes switch 18 in a holding circuit 19 for the solenoid. In this way the welding circuit remains open and the operator in attempting to restart the welding operation is necessarily informed as to the cause of the stopping. He can then clean the contacts or otherwise remedy the trouble. When he is ready to restart the welding operation, he pushes a button switch 20 in holding circuit 19 which results in deenergization of solenoid 17 and closing of the circuit breaker 8.

In place of or in addition to the holding circuit it is possible to provide a signal such as a bell or red light to be operated by switch 18.

Various embodiments of the invention may be employed within the scope of the accompanying claims.

I claim:

1. An apparatus for electric arc welding with a metallic weldrod, comprising a contact to convey welding current to the metallically conducting part of the weldrod at a point near to the welding arc, and a protective device responsive to the drop of potential due to flow of welding current between the contact and the metallically conducting part of the weldrod to interrupt the welding current when said drop of potential exceeds a predetermined value.

2. An apparatus for electric arc welding with a metallic weldrod, comprising a contact to convey welding current to the metallically conducting part of the weldrod at a point near to the welding arc, a relay responsive to the drop of potential due to flow of welding current between the contact and the metallically conducting part of the weldrod, and means actuated by the relay to interrupt the welding current when said drop of potential exceeds a predetermined value.

3. An apparatus for electric arc welding with a metallic weldrod, comprising a contact to convey welding current to the metallically conducting part of the weldrod at a point near to the welding arc, a relay responsive to the drop of potential due to flow of welding current between the contact and the metallically conducting part of the weldrod, an electrical circuit which is closed by the relay when said potential drop exceeds a predetermined value, and means actuated by the closing of the electrical circuit to interrupt the welding current.

4. An apparatus for electric arc welding with a metallic weldrod, comprising a contact to convey welding current to the metallically conducting part of the weldrod at a point near to the welding arc, a relay responsive to the drop of potential due to flow of welding current between the contact and the metallically conducting part of the weldrod, an electrical circuit which is closed by the relay when said potential drop exceeds a predetermined value, and a circuit breaker in a lead supplying welding current to the welding arc which is opened by the closing of the aforesaid electrical circuit.

5. In electric welding apparatus employing a metallic weldrod, a contact for conveying welding current to the metallically conducting part of the weldrod at a point near to the welding operations, means to detect an increase in the potential drop between said contact and weldrod, and means responsive to said first named means for interrupting the welding current to stop the welding operations when said voltage drop exceeds a predetermined amount.

6. In electric welding apparatus employing a metallic weldrod, a contact for conveying welding current to the metallically conducting part of the weldrod at a point near to the welding operations, means to detect an increase in the potential drop between said contact and weldrod, means responsive to said first named means for interrupting the welding current to stop the welding operations when said voltage drop exceeds a predetermined amount, and means for holding said welding circuit open until the operator resets the apparatus.

7. In electric welding apparatus employing a metallic weldrod, a contact for conveying welding current to the metallically conducting part of the weldrod at a point near to the welding operations, means to detect an increase in the potential drop between said contact and weldrod, and means responsive to said first named means for indicating such increase to the operator when said voltage drop exceeds a predetermined amount.

PERRY ANDERSON.